No. 763,168. PATENTED JUNE 21, 1904.
J. B. ENTZ.
CURRENT REGULATOR.
APPLICATION FILED MAY 7, 1903.
NO MODEL. 2 SHEETS—SHEET 2.

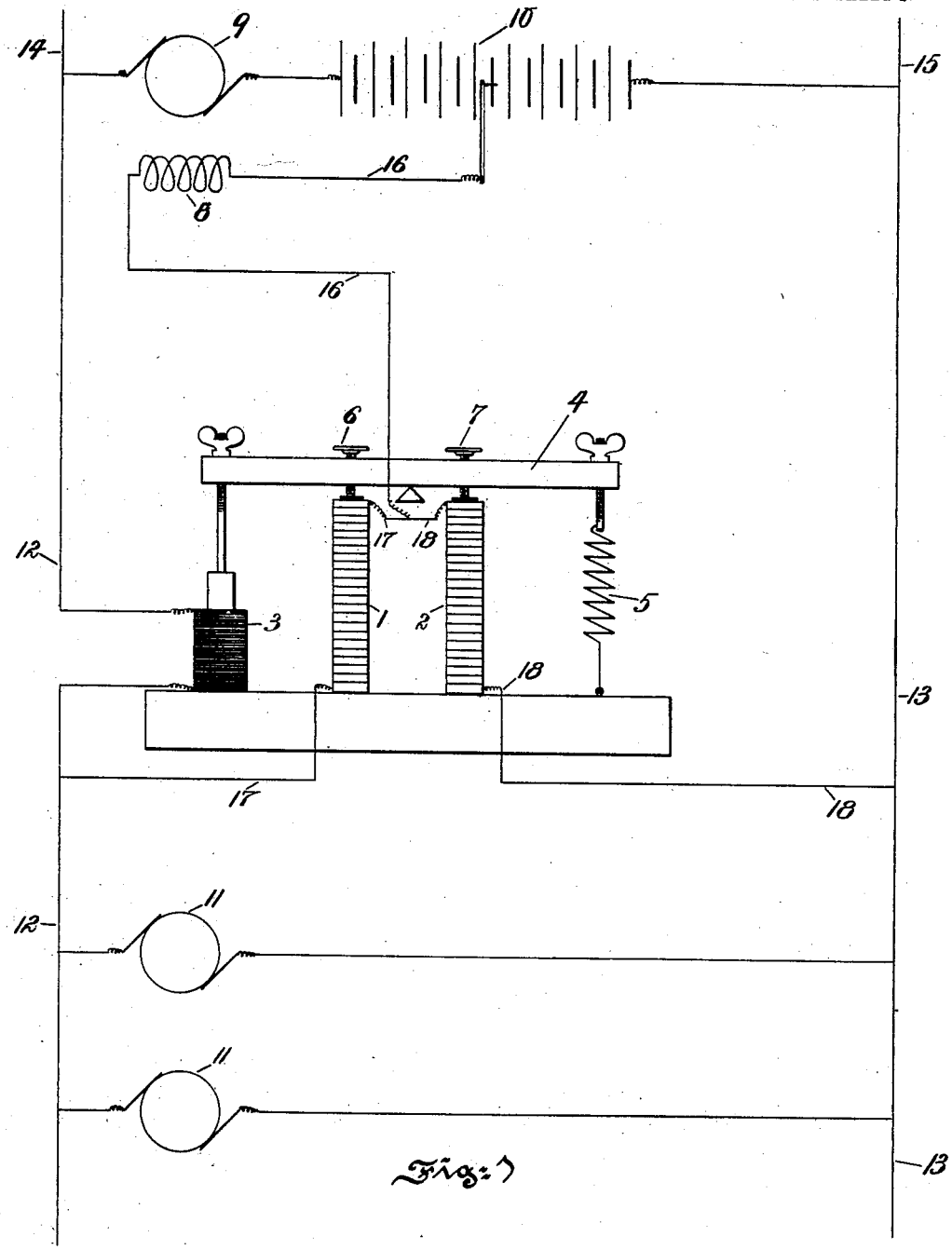

WITNESSES:

INVENTOR.
Justus B. Entz
BY
Augustus B. Stoughton
ATTORNEY.

No. 763,168.                                                                    Patented June 21, 1904.

UNITED STATES PATENT OFFICE.

JUSTUS B. ENTZ, OF PHILADELPHIA, PENNSYLVANIA, ASSIGNOR TO ELECTRIC STORAGE BATTERY COMPANY, OF PHILADELPHIA, PENNSYLVANIA, A CORPORATION OF NEW JERSEY.

CURRENT-REGULATOR.

SPECIFICATION forming part of Letters Patent No. 763,168, dated June 21, 1904.

Application filed May 7, 1903. Serial No. 155,976. (No model.)

*To all whom it may concern:*

Be it known that I, JUSTUS B. ENTZ, a citizen of the United States, residing at the city of Philadelphia, in the county of Philadelphia and State of Pennsylvania, have invented a certain new and useful Current-Regulator, of which the following is a specification.

One object of the invention is to control regulation from small changes in the circuit to be regulated.

Another object of the invention is to effect more perfect regulation than was heretofore obtained.

Another object of the invention is to get regulating effects from small percentages of load changes instead of from the whole load changes.

Another object of the present invention is to provide for regulating the load on a generator or generators by causing a storage battery to charge or discharge.

Another object of the invention is to reduce the size of the booster-governing coil or field-winding.

Another object of the invention is to effect good regulation notwithstanding the usual occurrence of a great variety of conditions—such as battery temperature, state of its charge, age, &c., and such as booster lag, &c.

Other objects of the invention will appear from the following description, and stated in general terms the invention comprises, first, a current-regulator consisting of groups of material of which the electrical resistance is responsive to pressure, means for changing the pressure of the members of said groups, and electrical connection including said groups, and, second, the combination, with a battery installation, including a booster, of a current-regulator consisting of material, as carbon, of which the electrical resistance is responsive to pressure and which is operatively arranged in respect to the booster-field to influence the booster to regulate the operation of the battery, and means responsive to variations in the circuit to be regulated and adapted to change the pressure upon said material; and the invention further comprises the improvements to be presently described and claimed.

The nature, characteristic features, and scope of my invention will be more fully understood from the following description, taken in connection with the accompanying drawings, forming part hereof, and in which—

Figure 3:
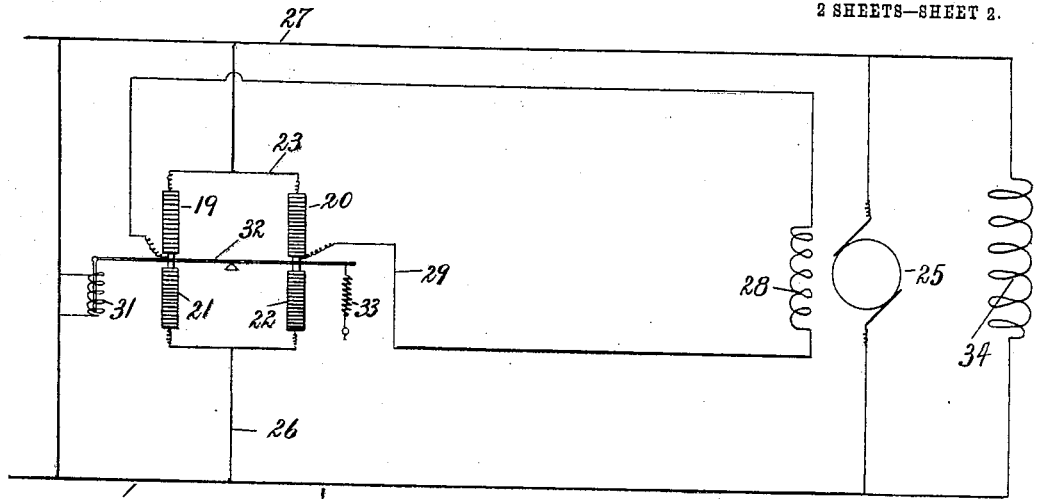
Figure 2:
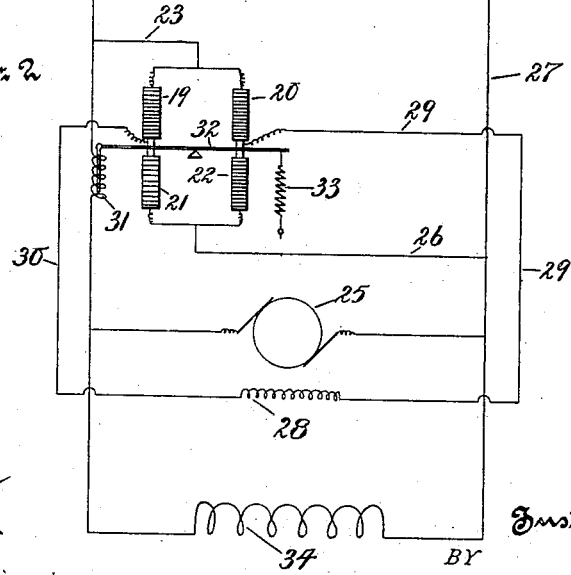

Figure 1 illustrates diagrammatically apparatus embodying features of the invention in application to a circuit selected merely for purposes of explanation. Fig. 2 similarly illustrates apparatus embodying features of a modification of the invention in application to different type of circuits and arranged to maintain a constant current output from a dynamo, and Fig. 3 is a similar view illustrating the apparatus in application to a different type of circuit and arranged to maintain a constant voltage from a dynamo.

The current-regulator consists of material, as carbon, of which the electrical resistance is responsive to changes in mechanical pressure. Referring more particularly to Fig. 1, the piles 1 and 2 of carbon blocks illustrate such material. The regulator also comprises means adapted to change the pressure upon said material. Referring again to Fig. 1, the solenoid 3, fitted with mechanism such as the centrally-pivoted arm 4, counterbalanced, as by the adjustable spring 5, and fitted with the screws 6 and 7, bearing upon the piles 1 and 2, is an embodiment of such means. 8 is the governing-coil, which influences the booster 9 to make the battery 10 charge or discharge or do neither. Of course the armature of the booster 9 is driven either mechanically, electrically, or in any appropriate manner. The generators 11, of which the number is immaterial, are arranged in multiple, with the battery across the leads 12 and 13, and the portions 14 and 15 of the leads show the working circuit. Of course this arrangement of generators, &c., is merely typical and is described for the purposes of explanation of the invention. The regulator is also fitted with circuit connections which include the materials, as carbon. So as to describe the invention a circuit has been shown in Fig. 1 originating at the center of the battery 10 and extending by 16 through the coil 8 and then divided, one half passing by 17 through the pile 1 and the other half passing by 18 through the pile 2, and likewise the coil of the solenoid 3 is shown as included in the lead 12.

The mode of operation of the described apparatus may be explained as follows: When the solenoid 3 attracts its core, the pile 1 is compressed and its resistance is diminished and pressure is relieved on the pile 2 and its resistance increases. Contrariwise, when the counterbalance draws the core out of the solenoid 3 the pile 2 is compressed and the pile 1 released, so that the resistance of the pile 2 is diminished and that of the pile 1 increased. Of course the counterbalancing of the part 4 is properly adjusted, and since the governing-coil 8 is included in the conductor 16, of which the branches include the piles of carbon 1 and 2, it follows that the governing-coil 8 is strengthened and weakened and that its polarity is reversed, and all of this is accomplished without any appreciable movement of any of the parts, because the arm 4 simply exerts pressure. By way of general explanation the following description of the operation of the invention in connection with the particular circuit illustrated may be given. When the pressure upon the piles 1 and 2 is equal, each is of equal resistance and the potential at the middle point, as where 16 joins 17 and 18, is the same as the potential at the middle point of the battery. Therefore no current flows through the field 8, and this may be taken to be the condition when the battery is neither charging nor discharging and when the generators are carrying the average load. If a change of load is occurring, say, an increase, the solenoid attracts its core and the resistance of the carbon 1 is less than that of the carbon 2, so that current flows by way of 17, 1, 16, and 8, and the effect of this is to cause current to traverse the coil 8 in proper direction for causing the battery to discharge and do the work required by the increase of load, and of course the amount of current flowing through the coil 8 is proportional to the degree of pressure exerted upon the pile 1 and release of pressure on the pile 2. If the load should fall off, the counterbalance 5 causes the pile 2 to be compressed and the pile 1 to be released, with the result that current traverses the coil 8 by way of 16, 2, and 18, thus energizing it, but in such a way that its polarity is reversed and it operates to cause the booster to give current in the opposite direction and charge the battery. The load on the generators is thus kept approximately constant.

In Fig. 2 the material, such as carbon, is shown as arranged in four groups 19, 20, 21, and 22, similar to the arrangement of the four resistance-arms of a Wheatstone bridge. Connection 23 connects the junction of groups 19 and 20 with the main conductor 24, running from one terminal of the generator 25, and connection 26 joins the junction of groups 21 and 22 with the other terminal 27 of the generator 25. The auxiliary field-winding 28 of the generator 25 is connected, respectively, to the junction of groups 20 and 22 by means of the connection 29 and to the junction of groups 19 and 21 by means of the connection 30. Means are shown adapted to change the pressure upon the several groups of the regulator. The solenoid 31, fitted with mechanism such as a centrally-pivoted arm 32, counterbalanced by the adjustable spring 33, is an embodiment of such means. 28 is a governing-coil which influences the field strength of the generator 25. 34 is a main field-coil of the generator. The regulator is shown as adapted to maintain a constant current output from the generator 25. When the solenoid 31 attracts its core with an equal pull to that of the spring 33, the pressure upon the respective groups of carbon is equal and there is no difference of potential between the terminals of the leads 29 and 30 and no current flows through the governing-coil of the generator 28; but when the current through solenoid 31 increases above its normal value, which is equal to that counterbalancing the pull of the spring 33, the pressure on the groups of carbon 21 and 20 is increased and the pressure on the groups of carbon 19 and 22 is decreased, so a current flows from 24 through 20, through 29, and through the governing-coil of 28 in opposite direction to that of the main exciting-coil 34 and by way of 30 through group 21 by way of conductor 26, through 27, completing the circuit. This flow of current through the regulating-coil in opposition to that of the main exciting-coil immediately tends to reduce the increase of current through the solenoid 31, therefore tending to reduce the increased flow of current and tending to maintain the current output of the generator at its original value. When the current through the solenoid 31 decreases, the groups of carbon which were previously compressed are now released from pressure, and those which were released of pressure have increased pressure put upon them, thus reversing the flow of current through the regulating-coil 28 and making it assist the main exciting-coil 34, and therefore tending to maintain the current output of the generator at its full value. Very small changes of current through the governing-solenoid 31 are sufficient to cause changes of current through the regulating-coil 28 of the generator, which will compensate for very considerable changes in the conditions of the working circuit or generator which would otherwise occasion large changes in the current output. In Fig. 3 an exactly similar arrangement of the parts of the regulator is shown, with the exception that the governing-solenoid instead of being included in the working circuit and in series with the full output of the generator is a fine wire coil connected across the terminals of the generator and responsive to changes in voltage of the generator. It is therefore adapted to maintain constant voltage at the generator in the same manner as constant current is maintained by the connection shown in Fig. 2.

It will be obvious to those skilled in the art to which my invention appertains that modifications may be made in detail without departing from the spirit thereof. Hence I do not limit myself to the precise construction and arrangements of parts hereinabove set forth and illustrated in the accompanying drawings; but,

Having thus described the nature and objects of my invention, what I claim as new, and desire to secure by Letters Patent, is—

1. The combination with a storage battery including a booster of a regulator comprising material of which the electrical resistance is responsive to pressure and which is operatively arranged in respect to the booster-field to influence the booster to regulate the operation of the battery and means responsive to variations in the circuit to be regulated and adapted to change the pressure upon said material, substantially as described.

2. The combination with a storage battery including a booster of a regulator comprising carbon operatively arranged in respect to the booster-field to influence the booster to regulate the operation of the battery and means responsive to variations in the circuit to be regulated and adapted to change the pressure upon the carbon, substantially as described.

3. A regulator for electric circuits comprising material of which the electrical resistance is responsive to pressure, means for supplying current through all said material, a connection intermediate said material, and means for increasing the pressure on part of said material in repect to other parts thereof to vary the potential at said connection, substantially as described.

4. A regulator for electric circuits comprising groups of material of which the electrical resistance is responsive to pressure, means for supplying current through all the members of said groups, a connection intermediate said groups, and means for increasing the pressure on part of the members of said groups in respect to the other parts to vary the potential at said connection, substantially as described.

5. The combination of a circuit to be regulated, an element responsive to changes of pressure and adapted to vary and reverse current, a pressure-changing device responsive to changes in the electrical condition of said circuit and operatively arranged in relation to said element, and a field-regulating coil connected to said element and adapted to have its current varied and reversed by changes of pressure on said element, substantially as described.

In testimony whereof I have hereunto signed my name.

JUSTUS B. ENTZ.

In presence of—
W. J. JACKSON,
K. M. GILLIGAN.